United States Patent
Czyszczewski et al.

(10) Patent No.: US 6,728,346 B2
(45) Date of Patent: Apr. 27, 2004

(54) USER RECOGNITION SUPPORT FOR MULTIFUNCTION OFFICE DEVICE

(75) Inventors: Joseph Stanley Czyszczewski, Boulder, CO (US); David George Greenwood, Lafayette, CO (US); James T. Smith, II, Boulder, CO (US); Luana L. Vigil, Longmont, CO (US); Ivan Woehr, Superior, CO (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 10/035,418

(22) Filed: Oct. 25, 2001

(65) Prior Publication Data

US 2003/0081742 A1 May 1, 2003

(51) Int. Cl.[7] .............................................. H04M 11/00
(52) U.S. Cl. ................................ 379/93.03; 379/93.02; 379/93.05
(58) Field of Search .......................... 379/93.03, 93.02, 379/90.01, 355.01, 355.02, 355.03, 355.04, 355.09, 93.05, 93.06, 93.07, 93.08

(56) References Cited

U.S. PATENT DOCUMENTS

2001/0005415 A1 * 6/2001 Grunsted et al. ........... 379/350
2002/0176565 A1 * 11/2002 Decrouy et al. ........ 379/355.01
2003/0120784 A1 * 6/2003 Johnson et al. ............. 709/228

FOREIGN PATENT DOCUMENTS

JP              410232583 A   * 9/1998   ......... G03G/15/22

* cited by examiner

Primary Examiner—Melur Ramakrishnaiah
(74) Attorney, Agent, or Firm—Ohlandt, Greeley, Ruggiero & Perle, L.L.P.; Scott Reid (57) ABSTRACT

A multifunction, communication device including a user recognition device for obtaining user identifying data from a user, an interface for receiving the user identifying data from the user recognition device, a memory for containing personal user contact data associated with the user, and a controller having a user interface for controlling the operation of the communication device by using the personal user contact data associated with the user in performing at least one function of the communication device. Control of the operation of the multifunction communication device includes obtaining user identifying data from the user, associating the user identifying data with the user's personal user contact data located in a memory, and performing a function of the communication device using the personal user contact data of the user.

15 Claims, 8 Drawing Sheets

USER RECOGNITION SUPPORT FOR MULTIFUNCTION OFFICE DEVICE

BACKGROUND OF THE INVENTION

1. Field of the Invention

The present invention pertains to multifunction communication devices, such as, but not limited to, devices that integrate facsimile, scanner, copier and/or printer functions, and more particularly to improved user recognition support and functionality for such devices.

2. Description of the Related Art

As the use of copiers, facsimiles, scanners, printers and e-mail have gained popularity and acceptance in the workplace, users of such devices have become increasingly dependant on them. Users have come to depend, for example, on the ease and convenience of sending and receiving e-mails and facsimiles of business correspondence, documents, etc. Users have also become accustomed to printing a copy of an electronic document at their disposal so that they can have a hard copy of the electronic document.

The convenience provided, and increasingly expected from copiers, facsimiles, scanners, printers and e-mail is enhanced by a multifunction device that integrates the functionality of a copier, a facsimile, a scanner, and/or e-mail into a single device. The advent and ubiquitous presence of the Internet has also raised users' expectations of accessibility to copiers, facsimiles, scanners, printers, e-mail and other sources of electronic information.

Users of e-mail, personal information managers (PIMs), and contact managers, whether using a PC or personal digital assistant (PDA), oftentimes generate and save contact information, including a list of other people to whom they intend to keep in contact with. The contact information generally includes a recipient's name, e-mail address, and other contact information, such as but not limited to, phone number, facsimile number, mailing address, etc. By generating and maintaining the contact information, an e-mail user can quickly and efficiently send an e-mail message to one or more recipients on their contact list without having to manually enter the e-mail address for each intended recipient.

Some printers, copiers and facsimiles incorporate functionality, or are controlled by device drivers or other software that enable the use of a contact list. For example, some facsimile machines can be programmed with the names and numbers (i.e., contacts) for transmitting facsimiles to frequently dialed numbers using a speed dial functionality of the facsimile. As another example, some types printers or copiers on a network (e.g., LAN, internet, etc.) can be addressed using a contact list resident on a user's desktop PC. In this example, the copier or printer's network address is listed in a contact list that is made available to the user, as a destination for a print or copy job. Access to the networked printer or copier and its associated contact information is often shared by numerous users within an organization.

As the above examples demonstrate, a copier, a facsimile, a scanner, printer, or e-mail can be enhanced when used in conjunction with a user's contact information. An advantage of using a contact list is that it allows the user to quickly and efficiently address e-mail, facsimiles, print and copy jobs to specific, designated recipients. A disadvantage of the above examples is that the contact information used by shared copiers, facsimiles, and scanners, or multifunction office devices is accessible to all users sharing the device, i.e., the contact information is made public to all of the users.

SUMMARY OF THE INVENTION

There is a need for enhanced user recognition support for copiers, facsimiles, scanners, printers, e-mail, and other systems incorporating the functionality of such devices so that, for example, users can access and use their personal contact information when performing the functions offered by the devices. The teachings herein provide a system and method for user recognition support for a multifunction office device. The multifunction office device may integrate one or more of the functions of a copier, a facsimile, a scanner, a printer, and/or e-mail. The multifunction device is not limited, however, to only including the functionality of a copier, a facsimile, a scanner, a printer, and/or e-mail however.

It is an object and advantage of this invention to provide improved user recognition support for copiers, facsimiles, scanners, e-mail, and systems incorporating the functionality of such devices.

The foregoing and other problems are overcome and the object of the invention is realized by methods and apparatus in accordance with embodiments of the teachings herein.

The present teachings pertain to a user recognition support system and method. In accordance with the present teachings, a multifunction device suitable for use with the user recognition support of the present invention is disclosed in the commonly assigned U.S. patent application Ser. No.: 09/557,118, entitled "Remote Database Support In A Multifunction Office Device"; Ser. No. 09/556,554, entitled "Fully Modular Multifunction Device"; Ser. No. 09/556,556, entitled "Multifunction Office Device Having A Configurable Document Processing Pipeline"; and Ser. No. 09/557,117, entitled "Multifunction Office Device Having a Graphical User Interface Implemented With A Touch Screen", all filed on Apr. 24, 2000, and incorporated herein by reference in their entireties.

The multifunction device may generally include a scanner, a printer, and a multifunction controller with a touch screen graphical user interface (GUI). The multifunction device supports scanning, printing, copying, sending and receiving facsimiles (faxes) and sending and receiving e-mails. In accordance with an aspect of these teachings, network connections are made between the printer and the multifunction controller. In addition, the scanner is also a modular device, and preferably uses a standardized personal computer (PC) interface, such as, but not necessarily, a SCSI interface. This arrangement enables the multifunction controller to work with a variety of printers and scanners, while maintaining the performance and appearance of an integrated device. The teachings herein also provide for modularly integrating with directory, library, e-mail, e-fax and e-form middleware, as well as print management middleware, also referred to as print servers, to significantly extend the capabilities of the multifunction device.

User recognition and integration with network-based services, such as a user contact database, simplifies the identification of a user's contact information at the multifunction device, thereby enabling a user to access and their personal contact information in performing the functions of the multifunction device. The user recognition aspects of the present teachings enable the multifunction device to quickly and unobtrusively recognize a user, and hence the user's personal contact information, and to then use personal contact information contact in conjunction with the functionality offered by the multifunction device.

The teachings herein also provide an ability to dynamically and bi-directionally integrate remote datastores or databases, including a user contact database containing personal user contact information. The information can be stored, accessed and/or routed to either local or remote locations. The datastore connection is preferably made through common networking interfaces, such as a global data communications network (the Internet is one example), and/or through a local area network (LAN).

In accordance with an aspect of these teachings, there is provided a "kiosk"-type workflow and interface into remote datastores, thereby allowing easy walkup access and recognition of a user in order to carry out tasks using the functionality of the multifunction device In accordance with an aspect of these teachings, the multifunction device can access remote datastores to obtain user-specific information such as personal user contact information, user profile and user security information, and can utilize this user-specific information with various functions of the system, including keystroke saving functions, limitation of access rights, and accounting information.

In accordance with these teachings there is provided a multifunction device that includes a multifunction controller, a first interface for coupling to a user recognition device for obtaining identifying information from a user of the multifunction device for verifying the user, and an interface for coupling to a global data communications network, such as the Internet, for receiving user contact information as well as other data for use by the multifunction device. Control of the operation of the multifunction device includes setting operational parameters, selecting a mode of operation of the multifunction device, and destinations for the delivery of documents and data. Control of the multifunction device can be implemented and improved through use of the user recognition aspects of the present invention.

The multifunction device's user interface and user recognition support enables a user to access and search their personal contact information, which is located in a user contact database and coupled to the multifunction device by, for example, a global data communications network.

The above and other objects, advantages and benefits of the present teachings will be understood by reference to the following description and drawings.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

By way of background to provide a technological context for the teachings of this invention, an overall description of a presently preferred embodiment of a multifunction device, that includes a user recognition functionality in accordance with this invention, will be provided. Further reference to the multifunction device described herein can be had by referring to the disclosures of the commonly assigned U.S. patent application Ser. No.: 09/557,118, entitled "Remote Database Support In A Multifunction Office Device"; Ser. No. 09/556,554, entitled "Fully Modular Multifunction Device"; Ser. No. 09/556,556, entitled "Multifunction Office Device Having A Configurable Document Processing Pipeline"; and Ser. No. 09/557,117, entitled "Multifunction Office Device Having a Graphical User Interface Implemented With A Touch Screen", all filed on Apr. 24, 2000, and incorporated herein by reference in their entireties.

Figure 1:
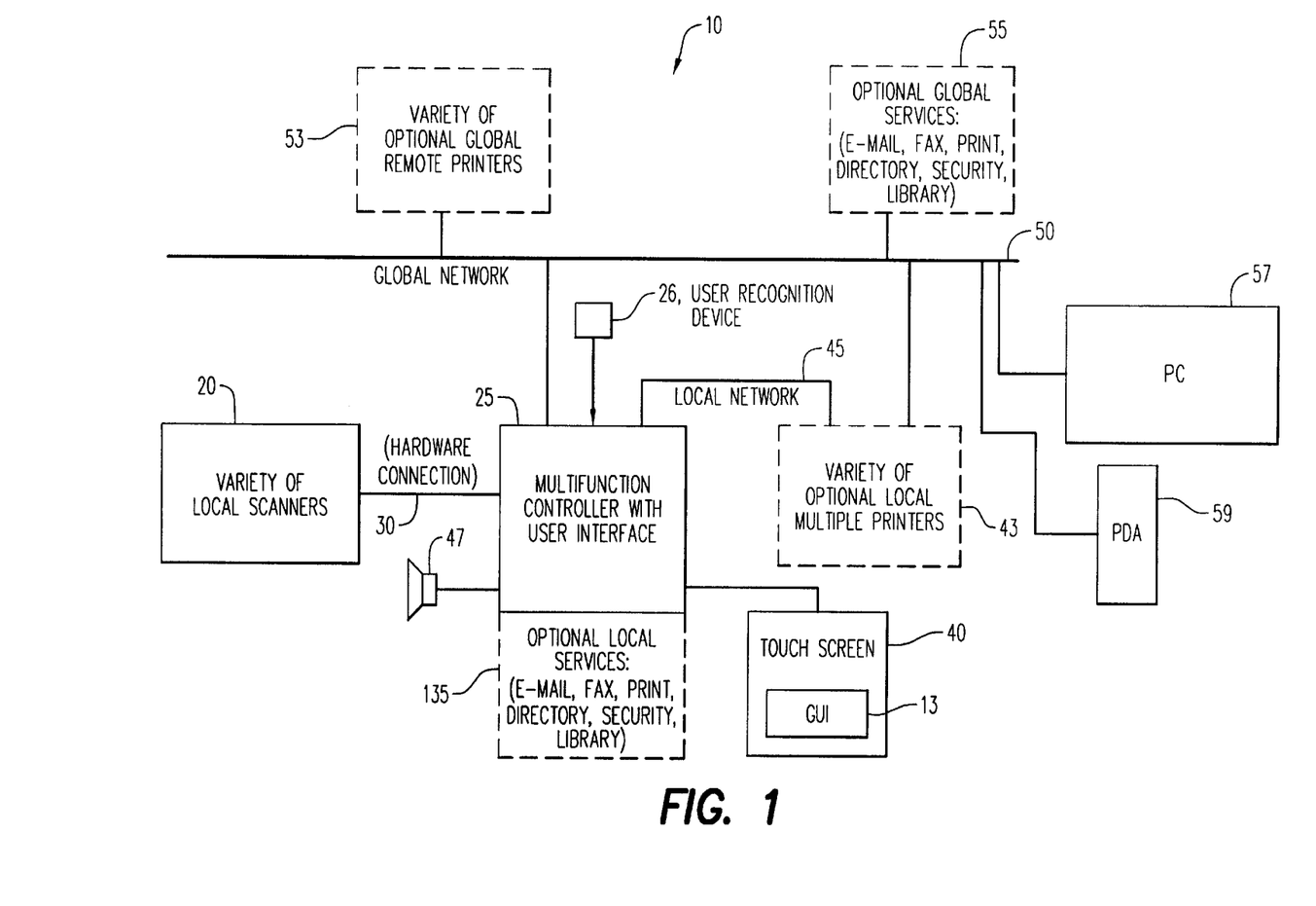
FIG. 1 is simplified block diagram of a multifunction device that is suitable for practicing this invention, the multifunction device including a multifunction controller that is coupled to a user recognition device and other components via local and global data communications networks.

FIG. 1 is a block diagram of a presently preferred embodiment of a multifunction device 10 in accordance with these teachings found herein. At least one scanner 20 is coupled to a multifunction controller 25 through a link 30, which is preferably a standard link, such as a SCSI interface. The multifunction controller 25 is coupled to a touch screen 40, which provides a Graphical User Interface (GUI) 13, and to an optional speaker 47 which can provide preprogrammed or synthesized audio responses to a user. The multifunction controller 25 is further optionally coupled to at least one printer 43 through a link 45, which is preferably a dedicated local network type interface. The printer 43 can be coupled separately to a global network 50 so that it can be accessed from other document sources, such as another multifunction controller 25 (see, for example, FIG. 3). The multifunction controller 25 is also coupled to the global network 50 and is thus capable of utilizing other optional global remote printers 53 on the global network 50. The multifunction controller 25 is thus also capable of communicating with, and utilizing, various optional global services 55 over the global network 50. The optional global services 55 can include, but are not limited to, e-mail, facsimile (fax), printer, directory, security and library services and data stores. The multifunction controller 25 is not limited to utilizing optional global services 55 on the global network 50, but also has the capability of implementing all or some of these services as optional, local services 135 at the controller 25. The optional global services 55 and the optional local services 135 associated with the user recognition support aspects of the present invention are explained in greater detail below.

A user recognition device 26 such as, but not limited to, a retinal scanner, a badge scanner, a smart card reader, a fingerprint recognizer, a voiceprint identification system, etc. is also interfaced, preferably by an industry standard interface, to the multifunction device 10. The user recognition device 26 can be integrated into the multifunction device 26 at the time of manufacture or coupled to the multifunction device at a later time. The user recognition device 26 and its interfaced operation with the multifunction device 10 will be discussed in greater detail below.

User recognition device 26 can be an identity sensor such as a card magnetic strip reader, a smart card reader, or a biometric sensor such as a fingerprint, retinal or voiceprint sensor, and/or the device 26 may be responsive to some indicia that uniquely identifies the user.

An optional microphone (not shown) can also be included for providing voice recognition, voice commands and voice prompts, via a suitable voice recognition function. The optional microphone can be part of and/or used by the user recognition device 26 to obtain a voice sample of the user of the multifunction device 10 for the purpose of identifying the user by a voiceprint.

It should be appreciated that an important function of the multifunction device 10 lies in the generation, inputting, processing, transformation, printing, reproduction, duplication and export of document data, wherein document data is assumed, for the purposes herein, to include textual information expressed in a language or character set, graphical information such as mathematical symbols, as well as image information such as scanned or electronically generated photographs, and a combination of textual, graphical and image information.

The global network 50 can be any communications network, public or private, suitable for linking the multifunction controller 25 to the optional remote printer 53 and to the optional global services 55. Global network 50 may include as a portion thereof one or more local area networks (LANs), a wide area network (WAN), an intranet and/or the Internet. It should be appreciated that the network 50 may be "global" in the sense that it reaches throughout the infrastructure of a particular organization, such as a corporation or a governmental department or agency, but it may not be directly accessible from outside of the organization.

Figure 2:
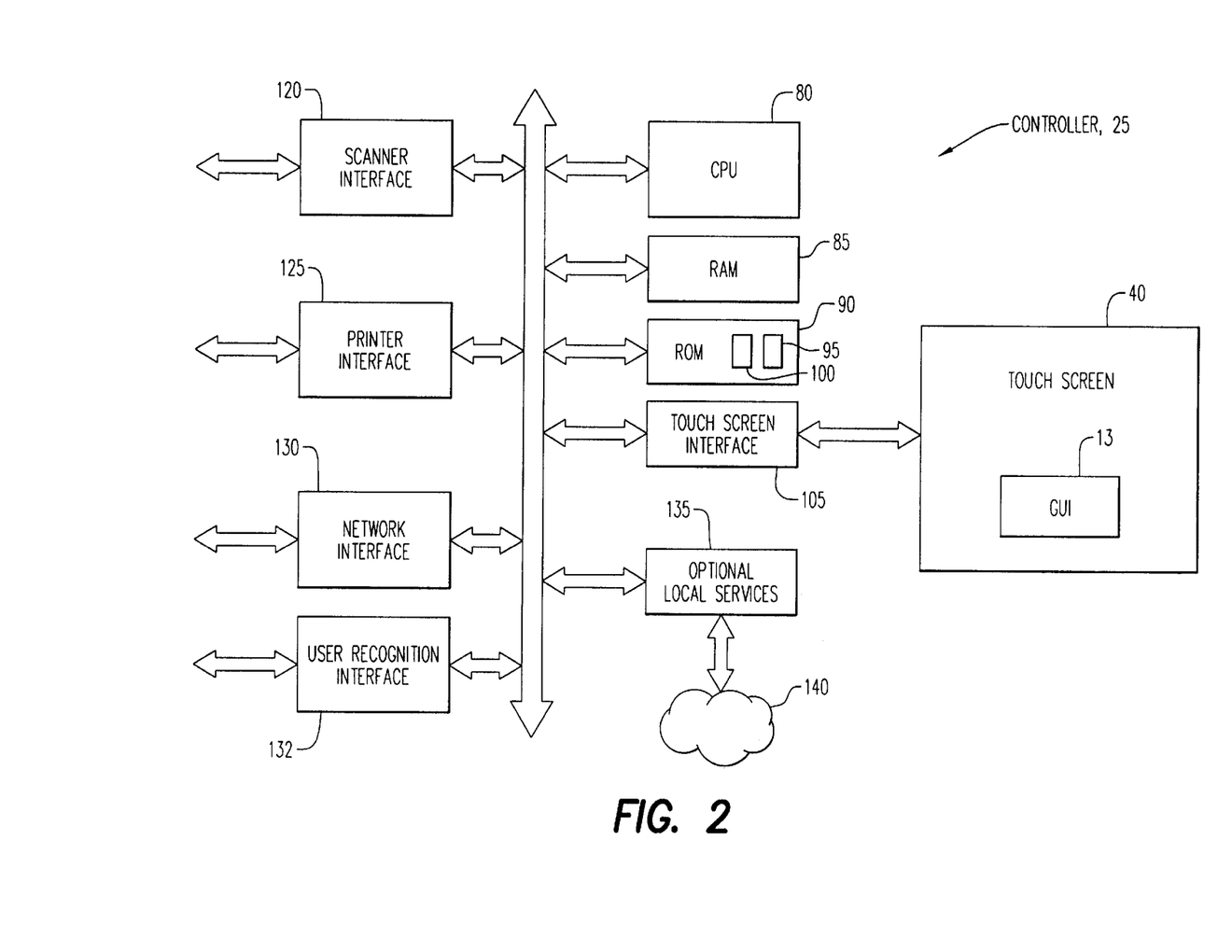
FIG. 2 is a block diagram that illustrates the multifunction controller of FIG. 1 in greater detail.

Controller 25 is shown in more detail in FIG. 2. The controller 25 includes a CPU 80, a random access memory (RAM) 85 for temporary storage of data, and a read only memory (ROM) 90 for permanent storage of data, which can include instructions for implementing a controller operating system 95, as well as a document processing pipeline program 100. The controller 25 also includes a touch screen interface 105 coupled to the touch screen 40. The touch screen 40 provides the Graphical User interface (GUI) 13 to the user of the multifunction system 10.

Controller 25 communicates with the scanner 20 (FIG. 1) through a scanner interface 120 (such as a SCSI interface), communicates with the printer 43 (FIG. 1) through a printer interface 125, communicates with the user recognition device 26 (FIG. 1) through a user recognition interface 132, and communicates with the global network 50 through a global network interface 130. The controller 25 may also include the optional local services 135. Further discussion of the user recognition device 26 and user recognition interface 132 is provided below.

Figure 3:
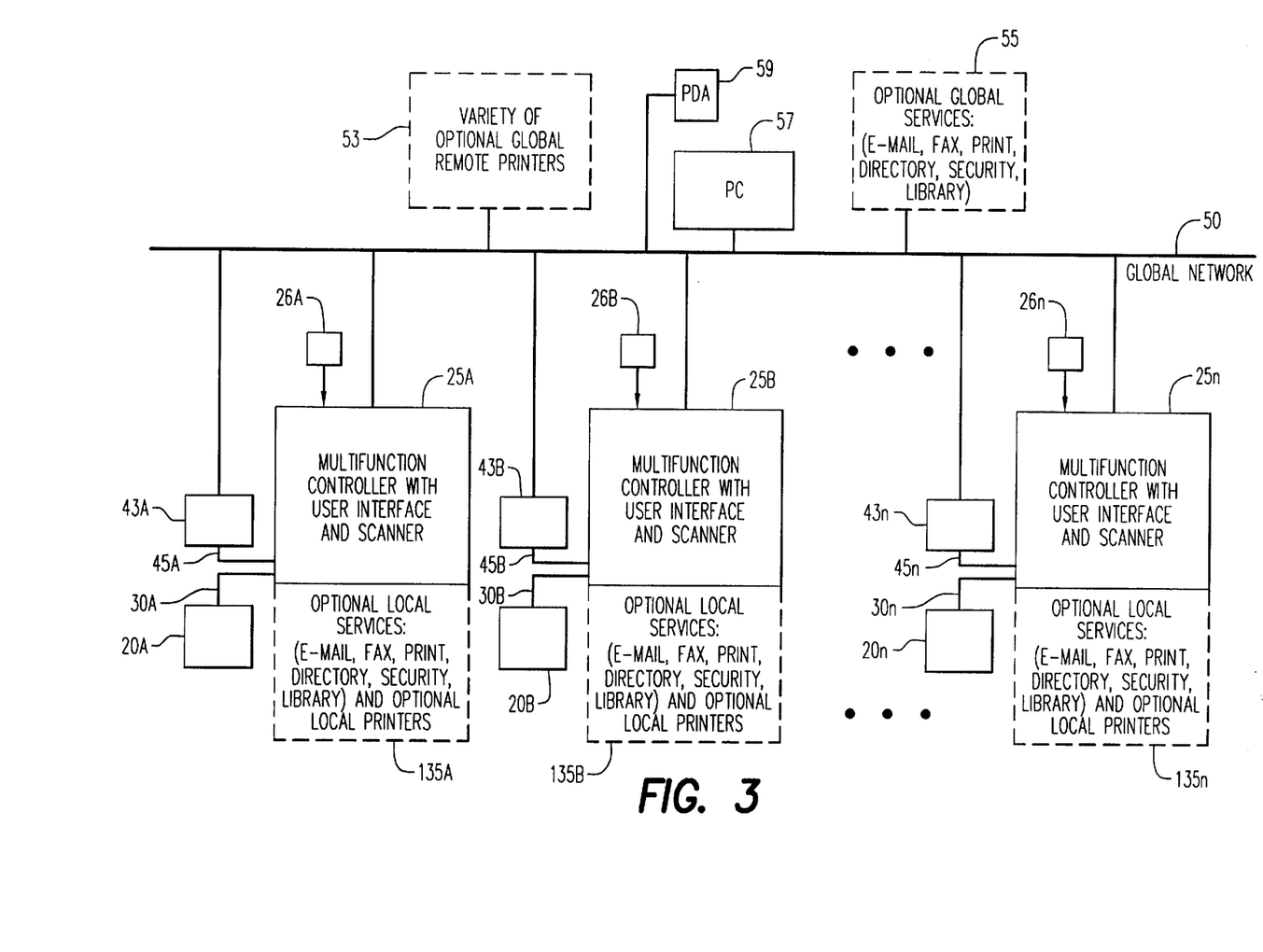
FIG. 3 is a block diagram that illustrates a plurality of multifunction controllers networked together into a distributed system of multifunction devices.

As is shown in FIG. 3, it should also be understood that a plurality of controllers 25A, . . . , 25n may be networked together, for example, to operate together over the global network 50 as a single system within a single organization. The networked multifunction controllers 25A–25n may further communicate and share resources, for example, global remote printers 53, user recognition devices 26A–26n, scanners 20A–20n, printers 43A–43n, optional global services 55, and optional local services 135A–135n.

Optional global resources 55 include databases, servers, and other such services generally available through the network 50. In the depicted networked configuration, the various multifunction controllers 25A–25n and other coupled devices are assumed to have unique network addresses so that messages and data can be routed to the desired multifunction controllers 25A–25n and other coupled devices (i.e., destinations) as needed. In accordance with the teachings herein, the user recognition support devices 26A–26n enable improved designation of the desired destination(s) of messages and data routed amongst, for example, the multifunction controllers 25A–25n and other network-connected devices.

Figure 4:
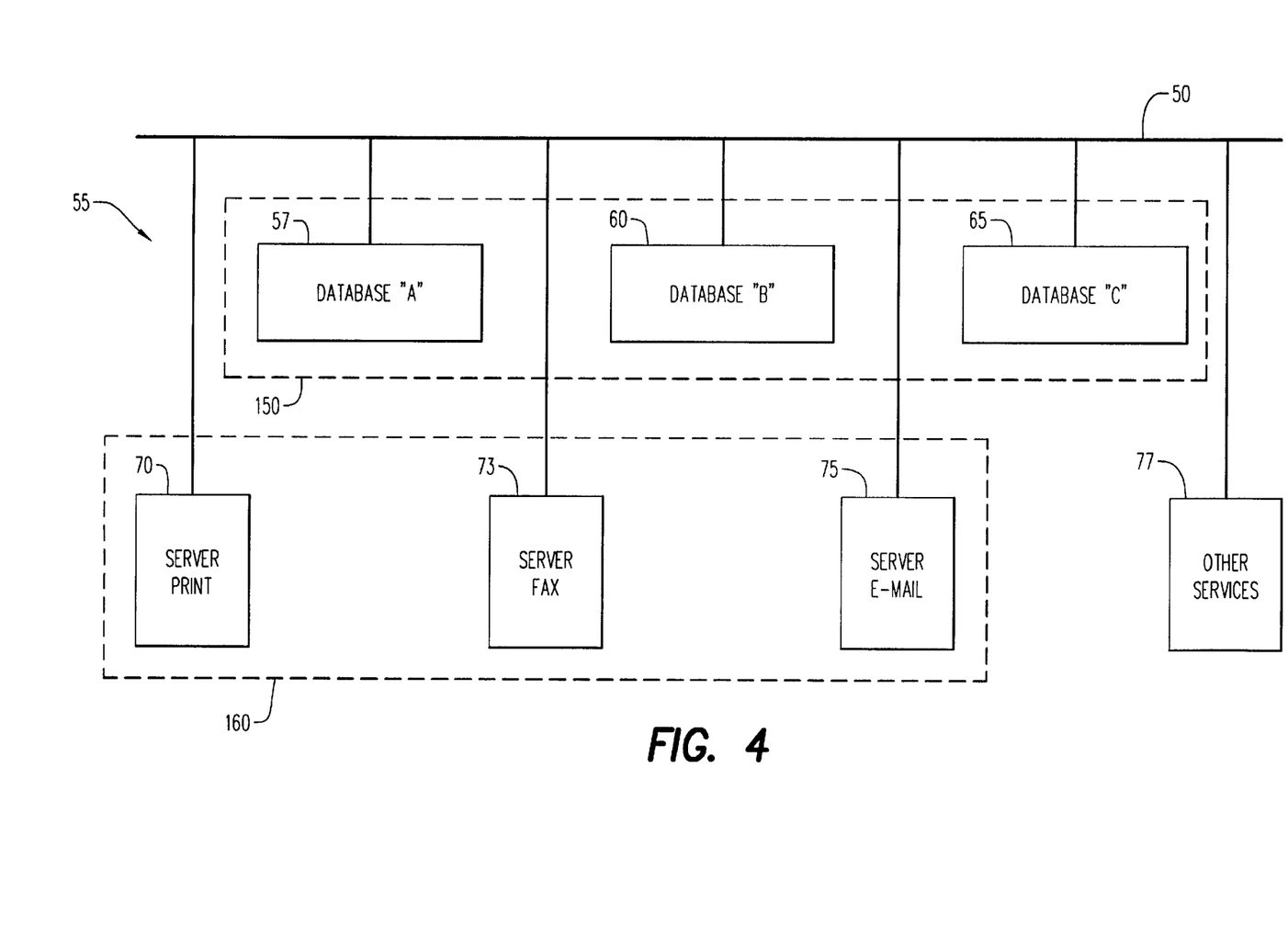
FIG. 4 is a block diagram that depicts a plurality of optional global services in greater detail, where the optional global services can be segregated by function, for example as databases, servers and other services.

FIG. 4 shows optional global services 55 in greater detail. Optional global services 55 may be segregated by functions, for example databases 150, servers 160, and other services 77. Databases A, B, and C (57, 60, and 65, respectively) may respectively store information regarding, for example, user profiles, user identification, user contact information, and forms. Servers 70, 73, and 75 may include, for example, a print server 70, a fax server 73 and an e-mail server 75.

Having optional global services 55 available on global network 50 is advantageous in that all of the multifunction controllers 25A–25n can have access to global services 55, regardless of their location in the network. Databases 150 serve as a single focal point of information, which simplifies organizing, synchronizing, and updating the database information.

It should be understood that while optional global resources 55 are shown in the context of a series of discrete services connected by global network 50, global resources 55 are not limited to a discrete, network-based implementation. Optional global services 55 may be incorporated in the multifunction controller 25 as optional local services 135, and may remain accessible to other controllers on global network 50. For the case where optional local services 135 include a fax capability, or other communication service-dependent functions, optional local services 135 may include a connection to a telephone network 140, as shown in FIG. 2, or some other wired or wireless communication link.

Figure 5:
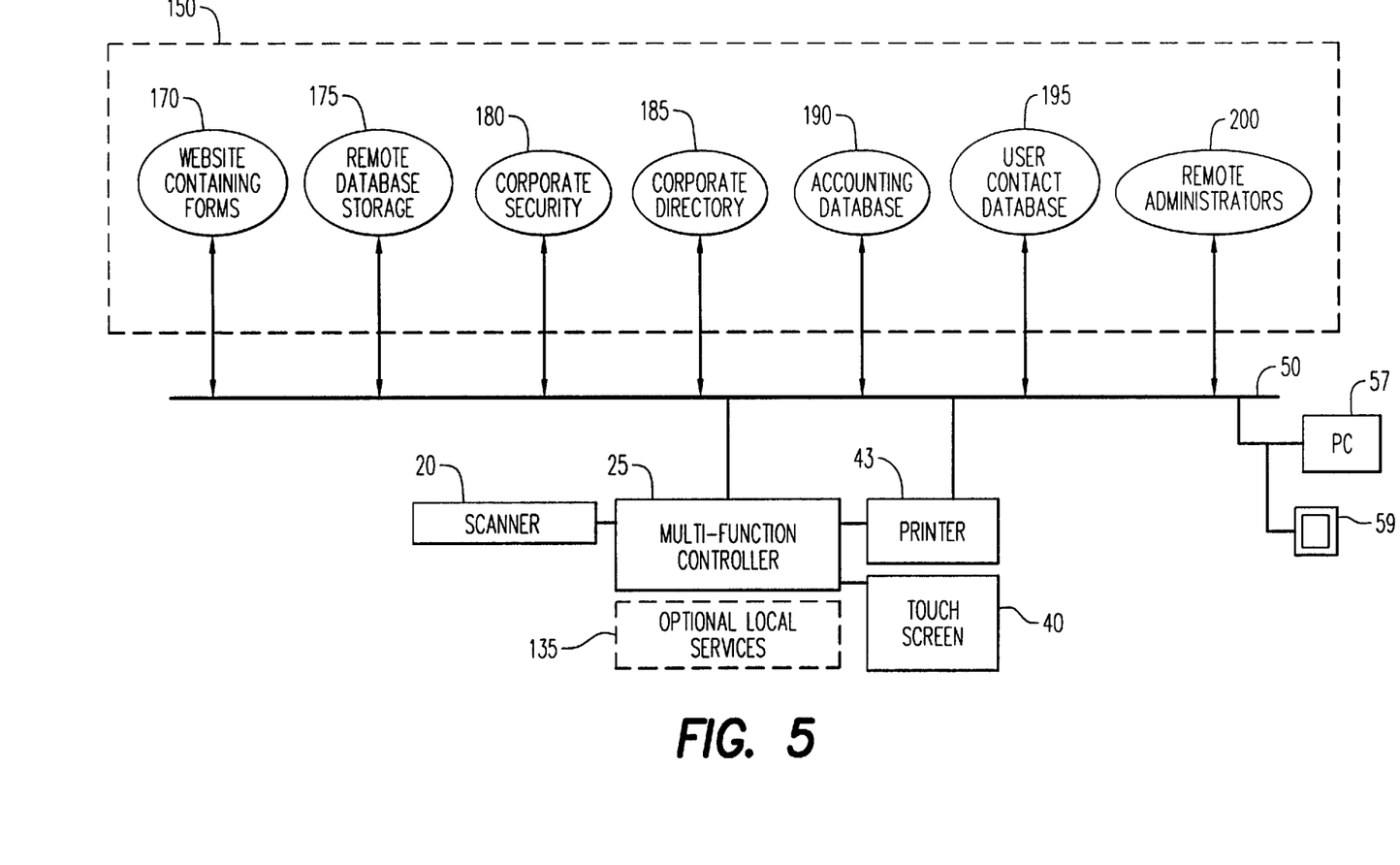
FIG. 5 illustrates exemplary databases that are part of the optional global services of FIG. 4, the databases including, for example, a user contact information database, a website containing standard forms, a remote storage database, a corporate security database, a corporate directory, an accounting database, and a remote administration database.

FIG. 5 shows an example of the databases 150 that form a part of optional global services 55. Databases 150 include, in an example wherein an organization is a corporation, a website containing standard forms 170, a remote storage database 175, a corporate security database 180, a corporate directory 185, an accounting database 190, a user contact database 195, and a remote administration database 200. Access between the databases 150 and the controller 25 is bi-directional through the global data communications network 50 such that the multifunction controller 25 can both retrieve information from and insert information into remote databases 150.

The website containing standard forms 170 allows users to access standard forms that an enterprise might use, for example, requisitions, health forms, expense reports, etc.

Remote database storage 175 may include any database information that may be useful to users, for example, archived documents, statistical databases for various types of analyses, etc.

Corporate security database 180 provides the system with user identification data for to verifying the identity and access privileges of a particular user. The information can include a particular user's employee number, databases that the user is authorized to access, etc. The connectivity via security database 180 also enables access to remote datastores 150 to obtain user information, such as the user contact database 195, that can be utilized in carrying out various functions of the system, including keystroke saving functions, designating delivery options, limitation of access rights, and accounting information.

Corporate directory database 185 can include user profiles, for example, a user's contact information, such as their department, division, or title within the enterprise, telephone number, fax number and e-mail address. Corporate directory database 185 is public, i.e., shared information that is accessible by multiple users of the multifunction device 10. A user can also store a particular fax cover sheet, or cover sheet information in the corporate directory database 185 for automatic retrieval by the controller 25. Corporate directory database 185 may be accessible via a website In accordance with an aspect of these teachings, upon obtaining the user's identification information through the user recognition device 26 and verifying the same by the referencing data located in corporate security database 180, the corporate directory database 185 can pass personalized greeting information to the controller 25 where it can be displayed on the touch screen 40 or played as an audio greeting through the speaker 47 (FIG. 1).

Still referring to FIG. 1, the accounting database 190 provides for cost tracking. For example, the multifunction controller 25 may report each time a fax is sent, a page is printed, etc. for allocating the costs of resources among various entities. These reports can thus be accumulated in the accounting database 190.

The user contact database 195 coupled to the global network 50 provides user-specific (i.e., personal) contact information. The user's personal contact information is transferred to the user contact database 195 from the device the user uses to create and maintain their user contact information, such as the user's local PC, PDA, electronic organizer, or mobile phone. That is, a user can import their personal contact information for use by the multifunction device 10 in lieu of manually entering the contact information directly into the multifunction device 10. Preferably, the contact information is transferred to multifunction device 10 using standard communication protocols and formats used in the PC and office equipment industry. For example, the contact information may be transferred using TCP/IP, serial communication, Blue Tooth™, or other protocols using RF, IF, or other signals. The user contact database 195 is an important aspect of the teachings herein and will be discussed in greater detail below.

Remote administrator's database 200 controls the index generation, query cycles, and other types of database administration functions, including access by the multifunction controller 25. For example, it may be desirable for the multifunction controller 25 to have access to only a subset of the databases 150 that are provided as part of the global optional services 55. This limited access is controlled by the remote administrator's database 200.

By using the set of functions of the multifunction device 10, such as fax, copy and/or e-mail, the user is provided access to local and remotely located data, and is provided an ability to use the available functions of multifunction device 10 from touch screen display 40. For example, the user can retrieve personal user contact information from a remote datastore, such as the user contact database 195, and fax, e-mail or print the document to a recipient location (i.e., address) selected from the user's personal user contact information. The user's personal contact information is transferred from the user contact database 195 to the device (e.g., multifunction controller 25, printer 53, copier 55, PC 57, or facsimile 55) coupled to the global network 50.

The information link between the user contact database 195 and PC 57 is dynamic in the sense that the contact information generated and maintained on PC 57 is preferably synchronized with the contact database 195, either on a continuous or a scheduled basis, such that the contact information generated and maintained on PC 57 is reflected in contact database 195. It should be appreciated that PC 57 may be replaced or supplemented by a PDA 59, a WEB-enabled mobile phone, or any other type of electronic device capable of generating and/or storing contact information. The synchronization of the contact information is preferably accomplished using software and/or hardware compatible with the device (e.g., PC 57, PDA 59, mobile phone, etc.) from which the contact information is transferred. For example, the multifunction device 10 is preferably compatible with the transfer protocol and format of popular and widely used PDAs. In this manner, a user can easily and conveniently use their PDA and its associated transfer (i.e., synchronization) software for transferring their personal contact information to the multifunction device 10 and user contact database 195.

Note that multifunction device 10 is intended to be compatible with a wide variety of contact information formats. Therefore, whether hardware or software implemented, the multifunction device 10 is enabled to communicate with PC 57, PDA 59, and other network devices, using industry-standard and other communication protocols and formats such that the multifunction device 10 is interoperable with a wide variety of printers, scanners, contact managers, databases, copiers, etc. This aspect of the present teachings allows a user to conveniently use their personal contact information with a multifunction device 10 from anywhere access to the multifunction device 10 is possible In accordance with a presently preferred mode of operation of the user recognition support system and method disclosed herein, the user recognition device 26 of the multifunction office device 10 is operable to obtain the identity of the user. As mentioned above, the user recognition device 26 can include a magnetic strip reader, a smart card reader, and/or biometric sensor device such as, for example, a retinal scanner, a fingerprint identification system, a voiceprint sensor for obtaining identifying information from a user and output, in some suitable format, the recognition data that is indicative of the identity of the user. Preferably, the user recognition device 26 unobtrusively, quickly, and securely obtains the identifying data from the user. However, the user-specific identifying information can also be conveyed to the multifunction device 10 from the user of the device 10 using an input query performed by the multifunction controller 25 (e.g., manually). At any rate, the multifunction device 10 uses the identifying information obtained from the user to verify the identity and, optionally, the access rights of the user, by referencing user identity lookup data located, preferably, in a central database, such as corporate security database 180.

The inventors have realized that users of office equipment typically create and maintain personal contact information on a device, such as a personal computer (PC), a personal digital assistant (PDA), a handheld PC, a mobile phone, internet appliance, etc. in order to efficiently use those devices. The personal contact information can include a user's contacts names, addresses, phone numbers, fax numbers, web homepages (URLs), e-mail addresses, bookmarks, and network addresses.

The operation of the above-described multifunction device 10 can be automated, at least in part, by using the user's personal contact information in carrying out at least one function of the multifunction device 10. For example, once the user's identity is verified by the multifunction device 10, and the user's personal contact information is associated with the user, a user's contact information can be used to designate a recipient of a copy or print job, facsimile, and/or e-mail.

In accordance with an aspect of these teachings, the personal contact information is electronically transferred to a central repository site, such as the user contact database 195, (e.g. multifunction device 10 website) (see FIG. 5) from the device where the user maintains his or her personal contact information, such as PDA 59. The central repository site may be a website for the multifunction device 10. The user contact information is transferred and stored for controlled access and use by the multifunction device 10. Thus, the user's personal contact information need not be separately created or maintained for use by the multifunction device 10. The user's personal contact information that is transferred to the user contact database 195 or the local multifunction device 10 for access and use by the multifunction device 10 can be dynamically synchronized with the user's personal contact information maintained on their PC, PDA, handheld PC, mobile phone, internet appliance, etc.

To provide user recognition support in accordance with the teachings herein, the multifunction device 10 can access the uploaded personal contact information transferred to database 195 that is accessible via the multifunction device 10 website on global network 50 from, for example, PC 57 or PDA 59, associate the identified user with their personal contact information, and transfer the user's personal contact information to the multifunction device 10. The user's transferred personal contact information is presented to the user by the multifunction controller 25 for the user to optionally employ when performing at least one of the functions contained within the multifunction device 10 and/or functions accessible using the multifunction controller 25 of other network coupled devices. In another aspect of the present teachings, contact information can be transferred from corporate directory 185 to multifunction device 10.

Personal contact information can be updated to include information. Operation of the multifunction office device 10 can be further carried out, for example, with the user scanning a document using the scanner 20, retrieving a document from one of the optional global services 55 or the optional local services 135, and specifying a destination(s) for the document selected from the user's personal contact information. Destinations can include local printers 43, network printers 53, fax machines 135, or Internet addresses, including e-mail addresses, or other local and remotely located network destinations.

Selection of the document destination(s) is preferably facilitated by having the multifunction device 10 access the central repository database 195 including the user's user-specific, personal user contact information. The user's personal user contact information is associated with the user identity information obtained by the user recognition device 26. The multifunction device 10 associates the identifying information obtained from the user with the user's personal user contact information that is preferably located in a central user contact database (either local or remote). The user's specific, personal user contact information can include, for example, addresses (local and remote), uniform resource locators (URLs), e-mail and facsimile address information contained in the user's personal contact information. Each user is able to retrieve and use their own personal contact information(i.e., a user's personal user contact information is not public or accessible for use by others).

After the document delivery destination(s) have been selected, the user operates the multifunction device 10 to send the document to the selected destination(s). It is important to note that the user preferably has the ability to send a document to any number of local or remote destinations, immediately and/or at some later time. For example, a single document may be sent to several printers, fax machines, e-mail addresses, network servers, etc., including those included in the user's personal contact information, at scheduled intervals, if desired.

In the configuration where a plurality of multifunction controllers 25 are networked together, as in FIG. 3, multifunction device 10 can provide the capability for the user to select a destination and/or designated recipient(s), for example, the printer 43n connected to another controller 25n, and to then instruct the system to hold the document, that is, to refrain from printing the document, until the recipient(s) requests that the document be printed. In this instance, the destination printer 43n, can be selected from the list of user-specific, personal user contacts that are personally associated with and presented to the user for use in performing at least one of the functions of the multifunction device 10. After selecting a destination from the personal contact information, and instructing the system to hold the document until requested by the recipient(s) (also chosen from the user's personal contact information), the network of multifunction devices 10 operates to further allow the recipient(s) to be identified by a particular one of the multifunction device 10 on the network 50. The particular multifunction device 10 approached and used by the intended recipient then polls the other multifunction devices 10 to locate the document being held for the recipient and then allows the recipient to redirect the held document to, for example, a printer 43 of the recipient's choice.

Figure 8:
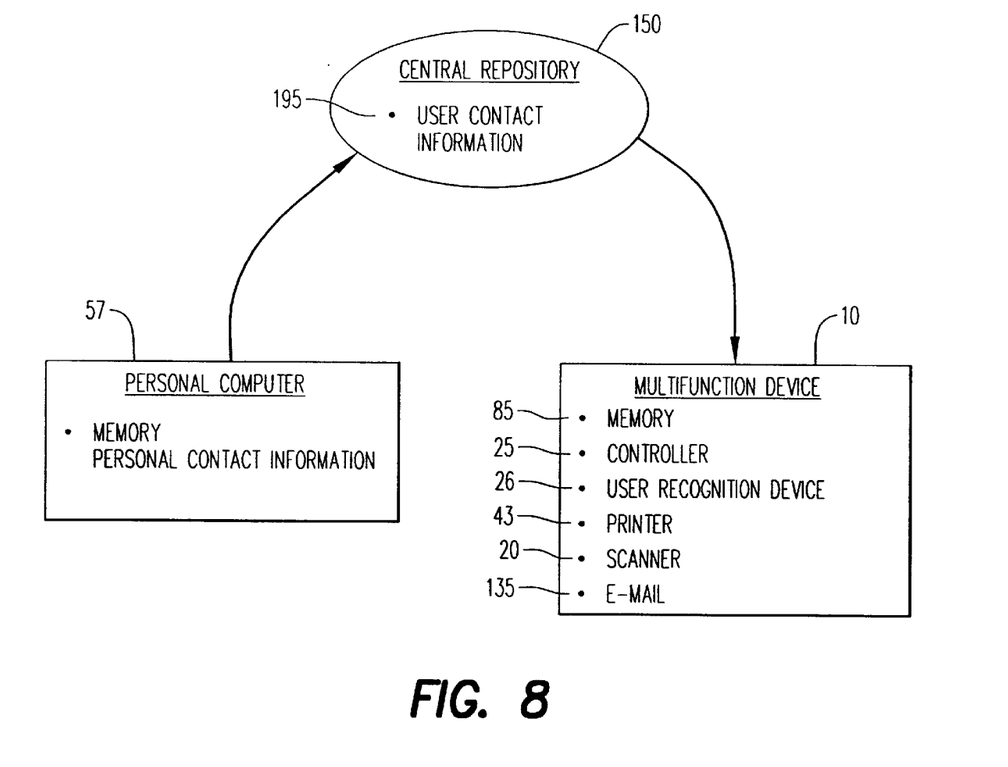
FIG. 8 is a simplified overview of the user contact information upload and download data flow.

As shown in FIG. 8, the multifunction controller 25 also has the ability to accept downloads of various characteristics of the databases 150, for providing an efficient use of the global network 50. For example, the multifunction controller 25 may query and download databases or portions of databases, such as user contact database 195, immediately or periodically, thereby ensuring that the personal contact information presented to the user at the multifunction device 10 is the most currently available personal contact data that has been uploaded to the contact database 195 from, for example, PC 57. These downloads, depending on the nature of the downloaded data and the frequency that the data is revised or updated, can occur, for example, on an hourly basis, or a daily basis, or a weekly basis, or each and every time a contact database 195 request is made. Thus, a user can upload his/her personal contact information, generated and maintained on PDA 59, to the contact database 195, and multifunction device 10 can download the contact information for use by the user in executing at least one of the features of the multifunction device 10.

By thus integrating this level of connectivity into the multifunction device 10, a user no longer need be concerned with manually entering their personal user contact information into a multifunction device 10 in order to have access to it. Manual entry of user contact information at the multifunction device is preferably an option that can be employed with multifunction device 10. The user need also not be concerned with maintaining multiple user contact information databases, or maintaining a copy of their personal user contact information in an unsecured environment, as preferably secure access to their personal user contact information is readily provided by the present teachings.

The multifunction device 10 can identify the user by comparing user identifying information, such as a voice sample provided by the user, to voice prints stored in a central database coupled to and accessible by the multifunction device 10. Upon positively identifying the user, the multifunction device 10 accesses user-specific personal contact information, such as local addresses, bookmarks, phone numbers, fax numbers, e-mail addresses, etc. The personal user contact information is preferably located in the central repository database 195 accessible to the multifunction device 10 via the multifunction device's website maintained on global network 50. The multifunction device 10 and other multifunction devices coupled to the global network 50 can all use the personal user contact information. The personal user contact information can be employed by the multifunction device 10 in performing local functions 135 and global services 55 of, for example, faxing, printing, scanning, e-mailing, and etc. to and from desired destination(s).

As was stated previously, the multifunction controller 25 also has the ability to accept transfers of various characteristics of the databases 150, for providing an efficient use of the global network 50. For example, the user contact database 195 includes the personal (i.e., not shared) user contact information for individual users. Thus, as discussed above, the user can avoid the necessity of manually entering their personal user contact information into the multifunction device 10 when it is already maintained in PC 57, PDA 59, etc.

As another example, assume that a company wishes to enable secure printing. Through the network connectivity of the multifunction device 10, documents can be accepted from remote users. Then, when the user is at a local device, the user can identify him/herself to the system via a secure method using user recognition device 26 (e.g., badge reader, fingerprint reader, voiceprint reader, retinal scanner, etc.). User identification information obtained through the use of the user recognition device 26 is then checked and validated against a database to determine the access privileges of the user, such as the corporate security database 180 of FIG. 5. The validated user is then provided access to all documents waiting for the user, and can further choose to print, fax, and/or e-mail the documents from the multifunction device 10 to designated recipients selected from the user's personal contact information located in the user contact database 195.

Once the user is identified to the multifunction device 10, the user's name, employee number, and/or other personal information located in corporate security database 180 can be appended to any outgoing documents automatically, such as to outgoing e-mails and faxes. The outgoing documents can be dispatched to recipient(s) selected from the user's personal contact information that is automatically transferred from the user contact database 195. Thus, the user is relieved of the inefficient, error-prone and time consuming effort of manually inputting the document recipient and destination information, as well as from manually creating items such as a separate user contact information database or fax cover pages for use by the multifunction device 10.

As an example, in order to fax a document, the user can manually enter the recipient's fax number using the multifunction device's user interface 25. However, in accordance with the teachings herein, the user can instead selectively search through their personal user contact information, as transferred to a database accessible via a website related to the multifunction device 10 and/or to a separately maintained and possibly remote user contact database 195. The user can selectively search for and designate the fax number, network address, or e-mail address of the desired fax recipient. The availability of the user's personal contact information, that is, the same user contact information maintained and available to the user on their PC 57, PDA 59, phone, etc., enables the user to efficiently and effectively route documents and data to desired destination(s).

Another example of the method of the user recognition support provided by these teachings is the process of e-mailing a document or file. In this case the user can selectively search through his or her personal user contact information, as transferred to the multifunction device 10, or, multifunction device 10 website accessible user contact database 195. Accordingly, advantageously the user can selectively search for and designate the e-mail address, URL, or network address of the of the desired e-mail recipient from their personal user contact information.

Figure 6:
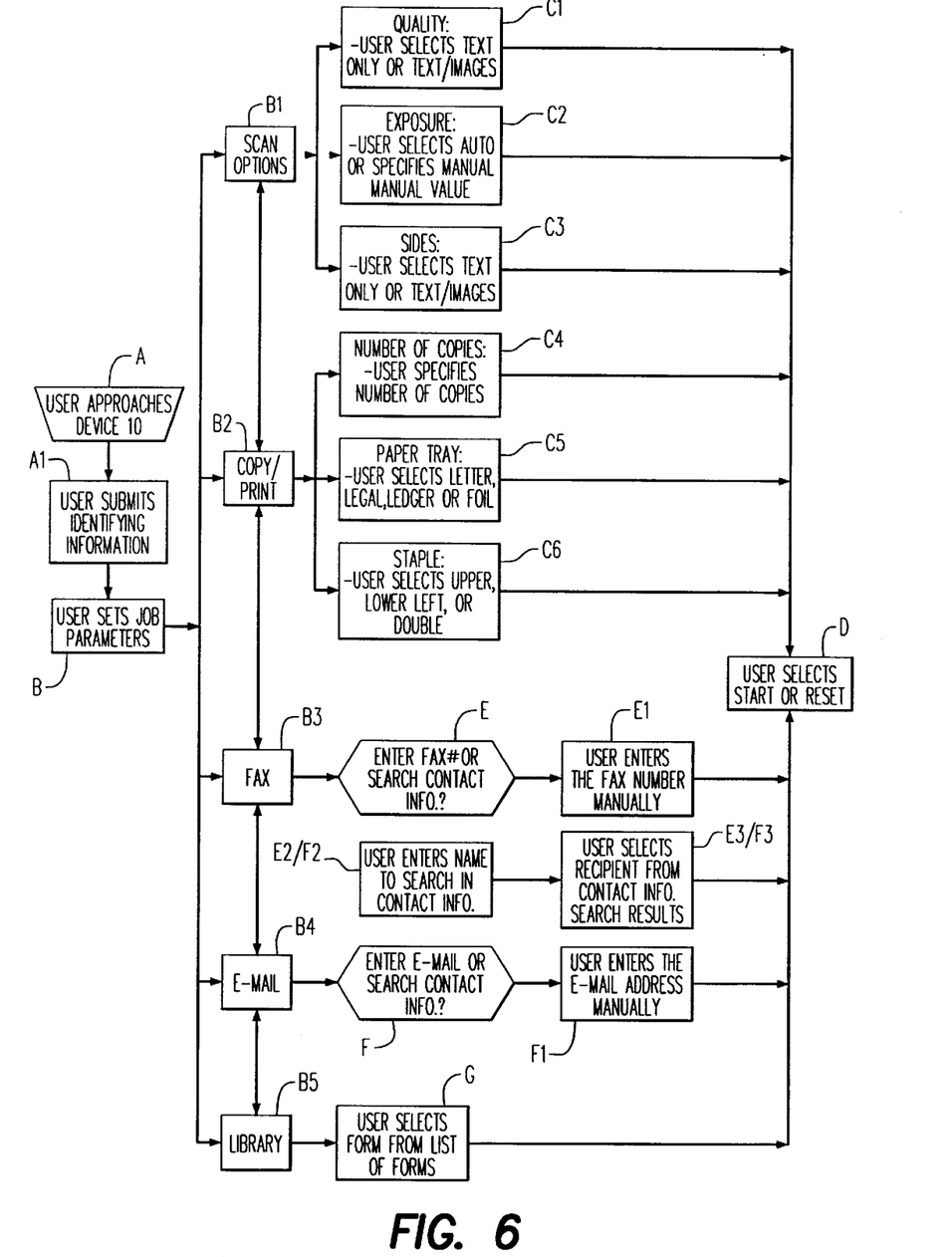
FIG. 6 is a logic flow diagram that is exemplary of the overall user control of the multifunction device 10, enhanced using the user recognition device 26 in accordance with the present teachings.
Figure 7:
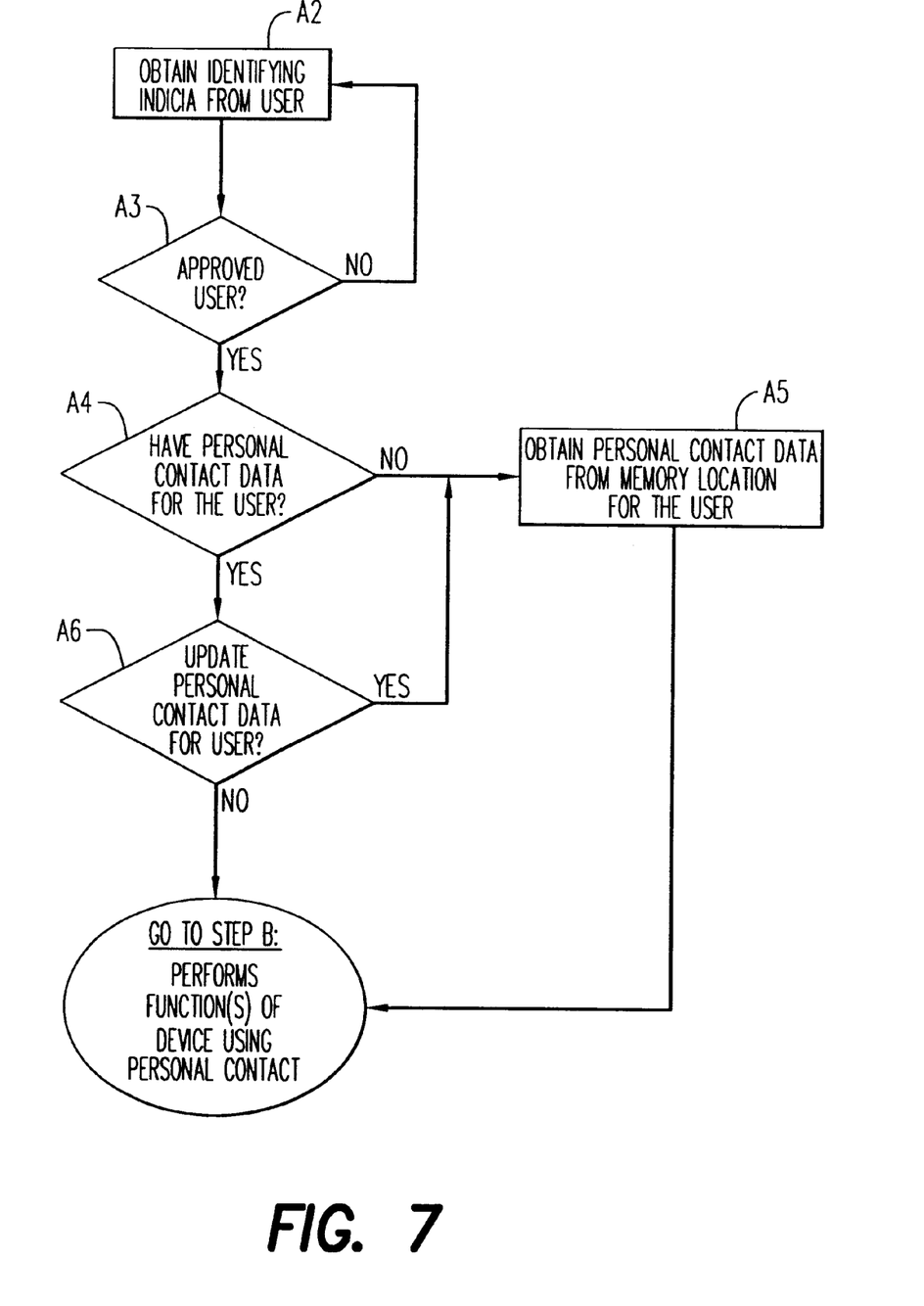
FIG. 7 is a detailed depiction of Step A1 of FIG. 6.

FIG. 6 is a logic flow diagram that is exemplary of the overall user control of the multifunction device 10, enhanced using the user recognition device 26 in accordance with the present teachings. At Step A the user approaches (i.e., walks up to) the multifunction device 10 and submits his/her identifying information, such as a badge with a magnetic strip or a smart card, or some type of biometric information such as fingerprint, retinal scan, etc., to user recognition device 26 at Step A1. A detail of Step A1 is depicted in FIG. 7 and discussed in greater detail below.

At Step B the user sets the parameters for a particular job. Step B entails selecting and setting parameters for one or a plurality of job types. The job types or options that can be selected using the GUI 13 include, but need not be limited to, a scan option (B1), a copy/printing option (B2), a fax option (B3), an e-mail option (B4) and a library function option (B5). It should be apparent from the arrows running vertically between the job options B1–B5 that more than one can be selected. For example, the user can select job option B1 to scan a document, as well as options B2–B4 to print, fax and then e-mail the scanned document, respectively. Alternatively, the user could select job option B5 to access a particular form, as well as job option B2 to print the selected form.

When selecting job options B1 and B2, the user is further enabled to set a number of job parameters or the user may simply use default parameters. The default parameters may be determined by the preferences associated with the user identified in Step A1 and as indicated in the user's personal contact information located in user contact database 195 or the user's personal profile located in the corporate directory. The user-settable job parameters include, but need not be limited to, quality, e.g. text or image/text resolution (C1), exposure (C2), number of sides (C3), number of copies (C4), paper tray, e.g., letter/legal (C5), and staple options (C6). Note that while job parameters C1–C3 are more specific to the document scan job option B1, all of the job parameters C1–C6 can apply to the print/copy job option B2. While not specifically indicated in FIG. 6, the various scan options can preferably be set at anytime, such as when setting copy, fax, e-mail and library options.

After selecting none, one, some, or all of the job parameters C1–C6, either automatically or manually, control passes to Step D, where the user presses either a Start key on the touch screen GUI 13 to start the selected job, or the user presses a Reset key on the touch screen GUI 13 to cancel the selected job and to reset any changed job parameters to their default values. The system also automatically resets after a predetermined timeout period (e.g., one minute).

If the user selects the fax job option B3 control passes to Step E where the user manually enters, using an on-screen keyboard/keypad, the recipient's fax number (Step E1), or where the user searches the local fax number book or personal contact database 195 in the global database 150, by entering at least a partial name or other information for locating and selecting the intended fax recipient (Steps E2 and E3). Control then passes to Step D to Start the fax job, or to cancel (Reset) the fax job.

If the user selects the e-mail job option B4 control passes to Step F where the user manually enters the recipient's e-mail address (Step F1), or where the user searches the local e-mail address book or directory database 135, or the appropriate global database 150, by entering at least a partial name or other information for locating and selecting the intended e-mail recipient (Steps F2 and F3). Note that the same directory or other database may have both the fax number and the e-mail address for various potential recipients, and that these need not be stored in separate databases. For example, all contact information for a particular intended recipient, including voice phone number, fax number, cellular phone number, e-mail address, mail station and the like can be stored in a single entry in the personal user contact database 195. In any event, control then passes to Step D to Start the e-mail job, or to cancel the e-mail job.

It should be remembered that a document can be sent to multiple output locations, such as a plurality of facsimile and/or e-mail recipients.

If the user selects the library job option B5 control passes to Step G where the user selects a form from the list of forms maintained either by the local forms database 135, or from the appropriate global database 150, such as the website containing forms 170. Control then passes to Step D to possibly print the selected form.

In FIG. 7, Step A1 is shown in greater detail. At Step A2 the identity of the user is obtained by user recognition device or identity sensor 26. It is then optionally determined whether the identifying indicia obtained by the user recognition device 26 matches a user approved to use the multifunction device 10 at Step A3. If the user is approved to use the multifunction device 10, it is determined whether there is any personal identifying data for the user at Step A4. If there is identifying data then the process proceeds to Step A5. If there is personal contact data for the user, it is then determined whether the data needs to be updated at step A6. The personal contact data accessible to the multifunction device 10 may be updated on a periodic schedule, every time a request for personal contact data is made to user contact database 195, or some other basis. By updated, it is meant that the personal contact information in memory or user contact database 195 is synchronized with PC 57, PDA 59, or any other device containing the user's personal contact information and interfaced with the multifunction device 10, either directly or indirectly through global communications network 50. If personal contact information has to be obtained for the user (Step A5) the personal contact data is obtained from user contact database 195 or other memory location. At any rate, the process then proceeds to Step B as indicated and continues as described above in reference to FIG. 6.

It should be remembered that document or data processed by the multifunction device 10 can be sent to multiple output locations (i.e., destinations), such as a plurality of facsimile and/or e-mail recipients. Accordingly, a user can specify more than one recipient from their personal user contact information located in the user contact database 195 for the automatic dispatch of the document or data.

Although described above in the context of a multifunction device and specific document functions, input/output devices, system architectures and the like, those skilled in the art should appreciate that these are exemplary and indicative of presently preferred embodiments of these teachings, and are not intended to be read or construed in a limiting sense upon these teachings.

Accordingly, while the invention has been particularly shown and described with respect to preferred embodiments of a multifunction device, it will be understood by those skilled in the art that changes in form and details of the device incorporating the system and method of the user recognition support of the present invention may be made therein without departing from the scope and spirit of the invention. For example, instead of a multifunction device having the user recognition support system and method of the teachings herein, a single function communications device can have the user recognition support system and method coupled thereto.

What is claimed is:

1. A communication device, comprising:
    at least one user recognition device for obtaining user identifying data from a user;
    a first interface for receiving the user identifying data from the user recognition device;
    a memory for containing personal user contact information comprising a plurality of data items associated with the user, the personal user contact information being transferred to said memory from a second communication device; and
    a controller for controlling the operation of the communication device by using, at least, the personal contact information associated with the user in performing at least one function of the communication device.

2. The communication device of claim 1, wherein said controller controls associating the identifying data with the personal, user contact information.

3. The communication device of claim 1, wherein said communication device comprises the functionality selected from a group consisting of a copier, a printer, a facsimile, a memory storage/retrieval device, and a scanner.

4. The communication device of claim 1, wherein said communication device comprises a user recognition device.

5. The communication device of claim 4, wherein said user recognition device comprises at least one of a device selected from a group consisting of badge reader, a retinal scanner, a card reader, a fingerprint identification system, and a voice print identification system.

6. The communication device of claim 1, wherein said communication device is interfaced with said second communication device over a global data communications network.

7. The communication device of claim 1, wherein said memory is accessed using a global data communications network.

8. The communication device of claim 1, wherein the personal contact information comprises data selected from a group consisting of a name, a local address, an Uniform Resource Locator(URL), a network address, a e-mail address, a phone number, and a fax number.

9. The communication device of claim 1, wherein the personal user contact information associated with the user is available for use by the user only.

10. The communication device of claim 1, wherein said second communication device is selected from a group consisting of a personal computer, a personal digital assistant, and a phone.

11. A method of operating a communication device having at least one function, comprising the steps of:

obtaining identifying data from a user of said communication device using a user recognition device;

receiving the identifying data obtained by said user recognition device;

associating the user identifying data with personal user contact data comprising a plurality of data items related to the user and located in a memory accessible by said communication device, wherein the personal user contact data is transferred to said memory from a second communication device; and     performing at least one function of said communication device using the personal user contact data.

12. The method of claim 11, wherein said step of obtaining the identifying data is accomplished using a user recognition device.

13. The method of claim 12, wherein said user recognition device is selected from a group consisting of a badge reader, a retinal scanner, a card reader, a fingerprint identification system, and a voice print identification system.

14. The method as in claim 11, wherein said step of associating comprises verifying the identity of the user.

15. The method of claim 11, wherein said step of associating comprises accessing the personal user contact data from said memory over a global communications network.

\* \* \* \* \*